Patented Mar. 11, 1930

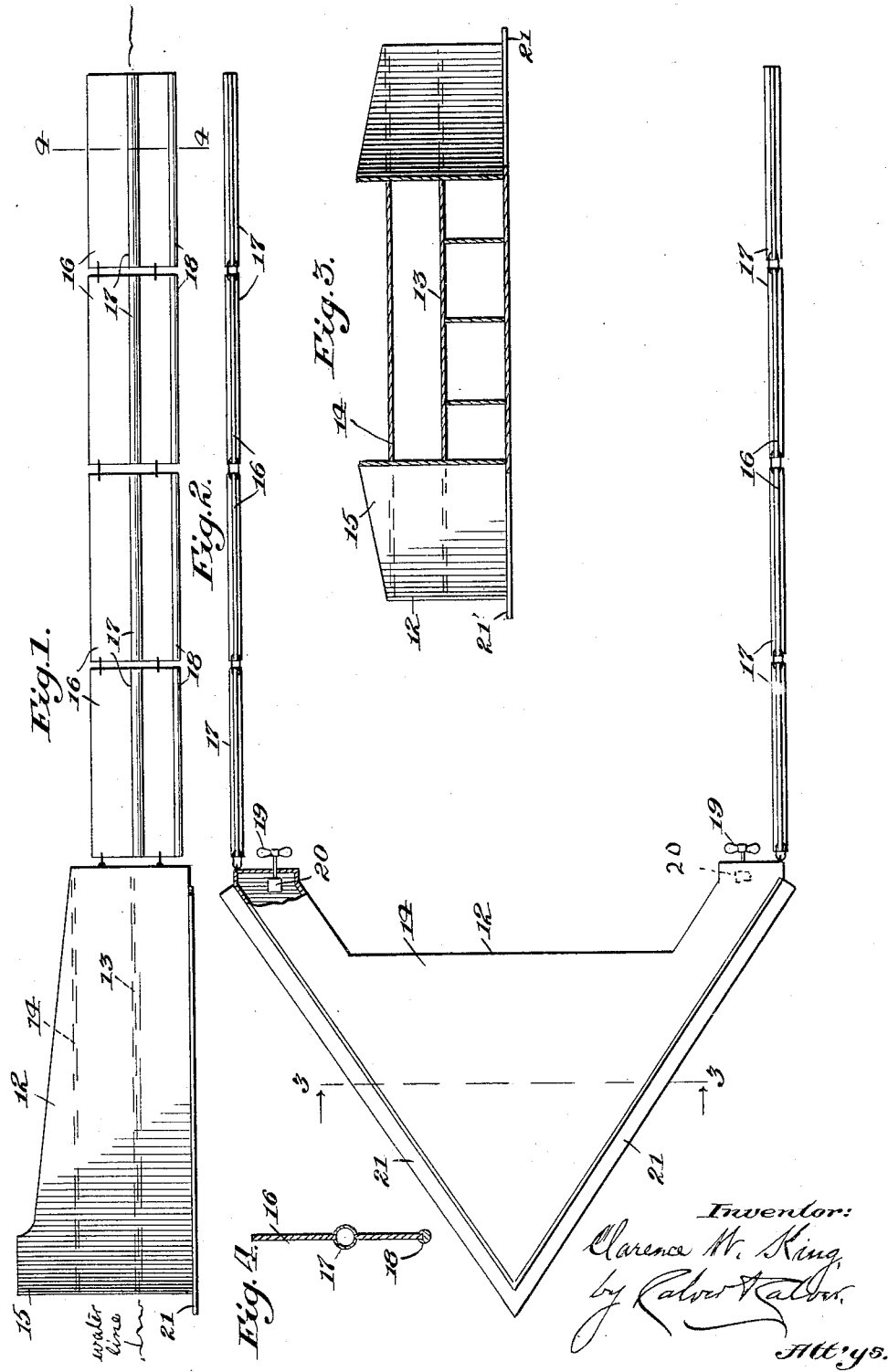

1,750,224

UNITED STATES PATENT OFFICE

CLARENCE W. KING, OF SHREVEPORT, LOUISIANA

FLOATING HARBOR

Application filed June 13, 1929. Serial No. 370,579.

This invention has for its object to provide a protected landing harbor for hydroplanes and other vessels in rough water. To this end the invention comprises a breakwater in the form of a floating hull, which will be faced towards the wind, and, connected with the outer sides of said breakwater, are floating planes or plates which will normally extend above the surface of the water and which, being widely separated from each other, will, with the breakwater, afford a harbor within which the water will be comparatively smooth, so that the hydroplanes and other vessels may safely land in the said harbor behind the said breakwater. In use the planes or plates, which form the sides of the harbor, will of course, be on the leeward side of the hull or breakwater, leaving the entrance end of the harbor open.

In the accompanying drawing Fig. 1 is a side view of the improved harbor. Fig. 2 is a plan view thereof. Fig. 3 is a section on line 3—3, Fig. 1, and Fig. 4 is a section, somewhat enlarged, on line 4—4, Fig. 1.

Referring to the drawing, 12 denotes a breakwater which is in the form of a floating hull and which, in the form herein shown, is constructed with a pointed prow. This floating breakwater may be anchored in place with its prow pointing into the wind, or may be maintained in this position by the use of propellers. The said breakwater is preferably provided with a lower deck 13, and the space below said deck will preferably be divided into water-tight compartments any or all of which may be filled, or partly filled, with water for the purpose of causing the breakwater to sink to any desired level, or for the purpose of trimming the same so as to balance the said breakwater on an even keel, or for the storage of fresh water, or oil, gasoline or other supplies. Above the deck 13 is an upper deck 14 above which are extended bulwarks 15 at the sides of said breakwater, the said deck 14 preferably being slanting so that any water dashing over the bulwarks may readily drain off.

Connected with the outer wings or sides of the breakwater are partly immersed floating planes or plates 16, extending above and below the surface of the water and the units of which may be flexibly connected by links or otherwise. These planes or plates may be of metal or wood, and if made of metal will be provided with floats 17, and with weights 18 at their bottoms, to hold them in an upright position.

The breakwater will preferably be provided at its rear with propellers 19 widely separated from each other and driven by motors 20. By means of these motor-driven propellers the breakwater may be navigated to any desired position and may also be steered by driving the widely separated propellers alternately or at different speeds. Also the propellers may be utilized to hold the breakwater to its anchorage in a heavy sea in very rough weather, or in position where the water is too deep for an anchorage.

The breakwater is preferably provided on its outer sides, below its water line, with horizontal blades or flanges 21 of any desired width, and which will serve to check the rising and falling movements of the breakwater under the action of the waves.

The space above the lower deck 13 may afford quarters for the crew of the breakwater and for crews and passengers of the hydroplanes, as also storage rooms for supplies and machinery.

The breakwater may be constructed of any suitable material such as wood, steel or concrete.

From the foregoing it will be understood that the invention provides a safe harbor for hydroplanes or other vessels in rough water. The invention is, however, not to be understood as being limited to the particular form of the breakwater herein shown and described, or to the other details set forth, as these may be widely varied, within the province of mechanical skill, without departing from the scope of the invention as defined by the claims hereunto appended.

Having thus described my invention, I claim and desire to secure by Letters Patent:

1. A protected harbor for hydroplanes or other vessels comprising a floating breakwater, to be exposed to the wind, and widely separated floating planes or plates connected with the rear of said breakwater and extending above the surface of the water so as to afford a harbor which is open at its rear for the entrance of the hydroplanes or other vessels.

2. A protected harbor for hydroplanes or other vessels comprising a floating breakwater, to be exposed to the wind, and widely separated floating planes or plates connected with the rear of said breakwater and extending above the surface of the water so as to afford a harbor which is open at its rear for the entrance of the hydroplanes or other vessels, said harbor having a pointed prow.

3. A protected harbor for hydroplanes or other vessels comprising a floating breakwater, to be exposed to the wind, and widely separated floating planes or plates connected with the rear of said breakwater and extending above the surface of the water so as to afford a harbor which is open at its rear for the entrance of the hydroplanes or other vessels, said breakwater having lower and upper decks, and the space below said lower deck being divided into water-tight compartments.

4. A protected harbor for hydroplanes or other vessels comprising a floating breakwater, to be exposed to the wind, and widely separated floating planes or plates connected with the rear of said breakwater and extending above the surface of the water so as to afford a harbor which is open at its rear for the entrance of the hydroplanes or other vessels, said breakwater being provided with power-driven propellers by which it may be navigated or steered.

5. A protected harbor for hydroplanes or other vessels comprising a floating breakwater, to be exposed to the wind, and widely separated floating planes or plates connected with the rear of said breakwater and extending above the surface of the water so as to afford a harbor which is open at its rear for the entrance of the hydroplanes or other vessels, said breakwater being provided, below the water line, with horizontal blades or flanges, to check the rising and falling movements of said breakwater by the action of the waves.

6. A protected harbor for hydroplanes or other vessels comprising a floating breakwater, to be exposed to the wind, and widely separated floating planes or plates connected with the rear of said breakwater and extending above the surface of the water so as to afford a harbor which is open at its rear for the entrance of the hydroplanes or other vessels, said floating planes or plates being formed of flexibly connected units.

In testimony whereof I affix my signature.

CLARENCE W. KING.